May 29, 1956 — C. P. HOOVERSON ET AL — 2,747,921
RETRACTABLE REAR WINDOW FOR AN AUTOMOBILE
Filed Dec. 22, 1952 — 5 Sheets-Sheet 5

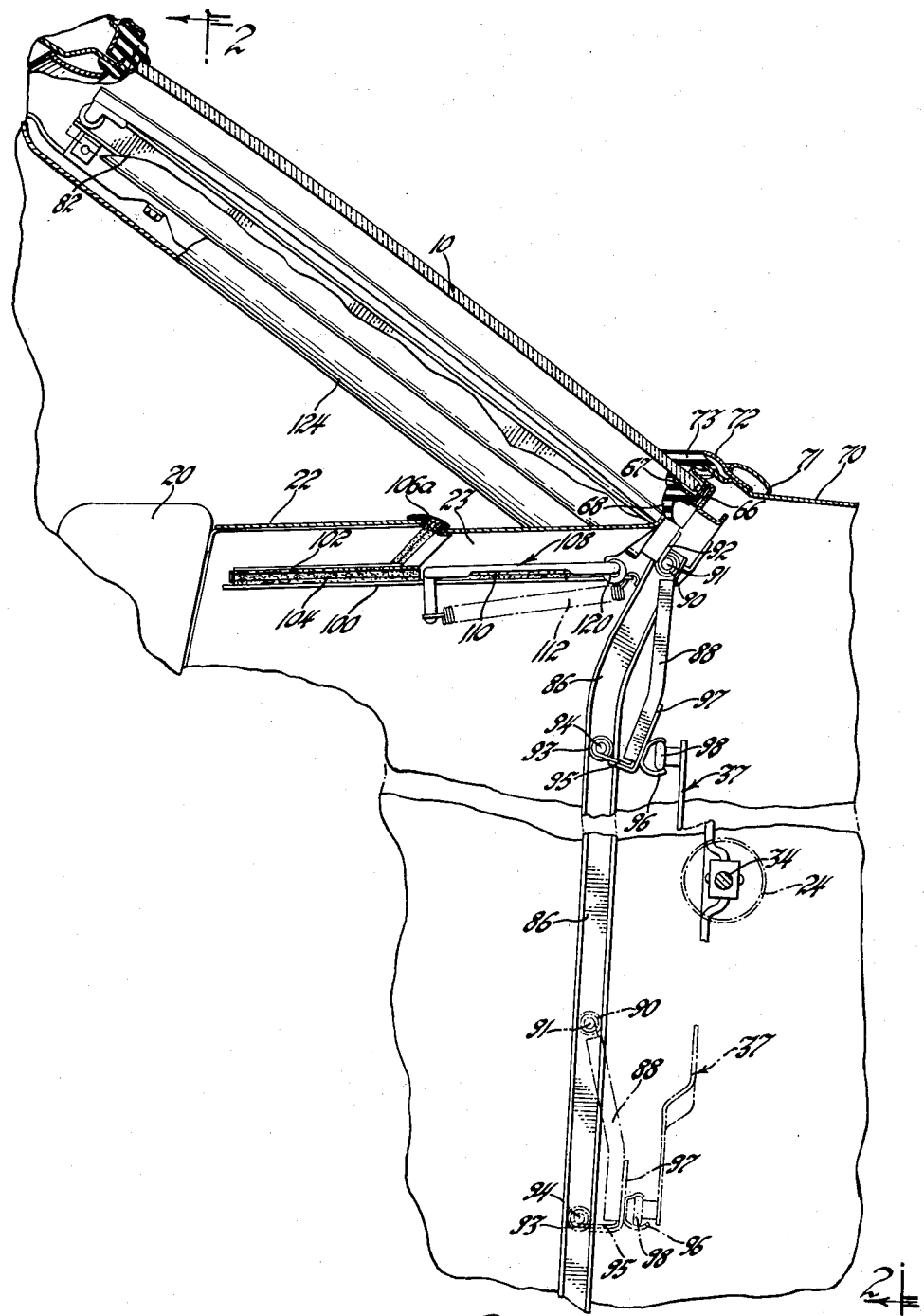

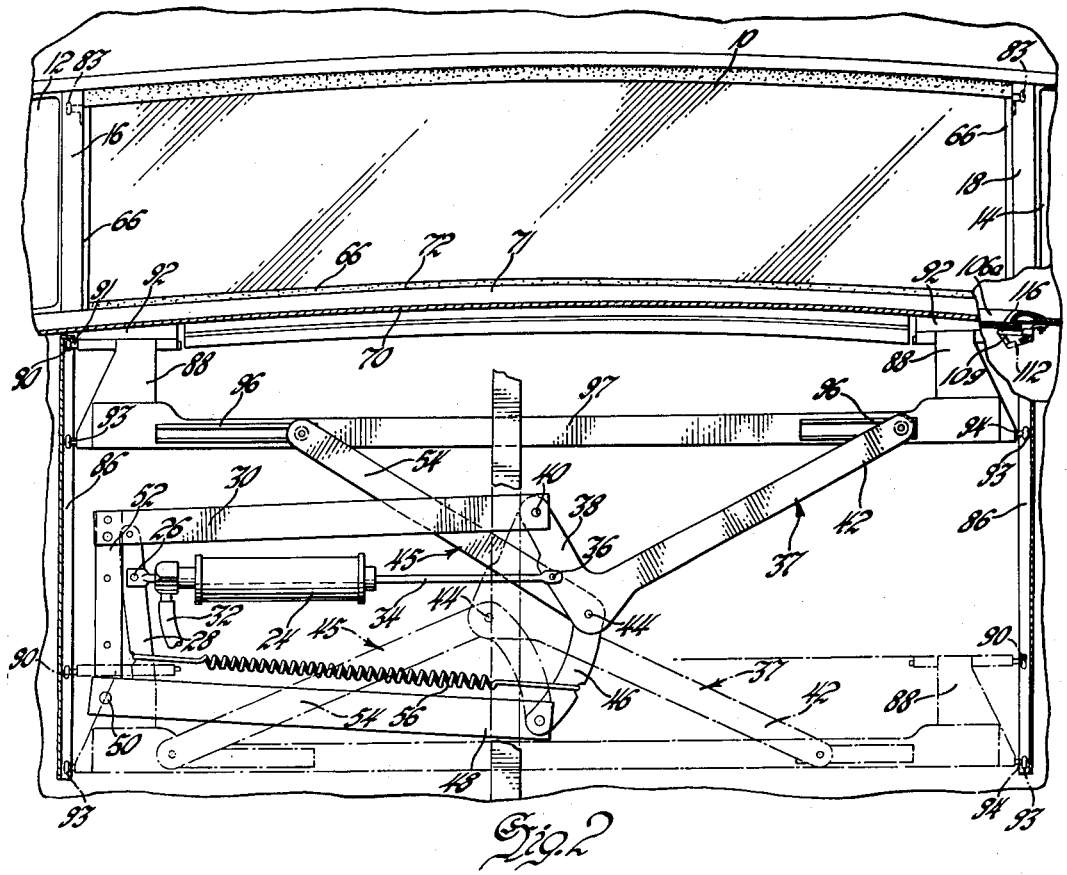
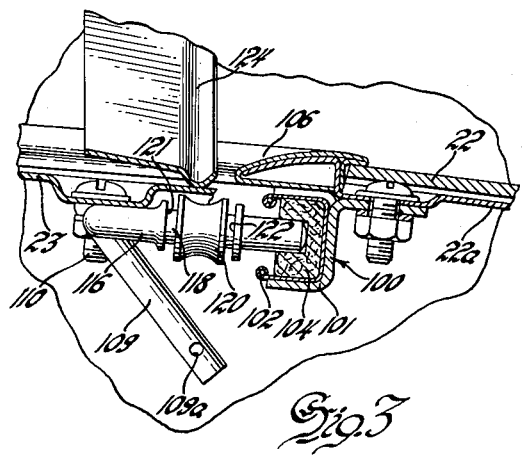
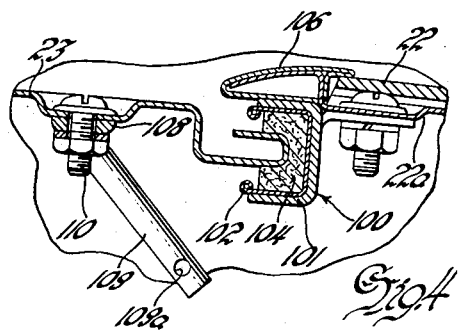

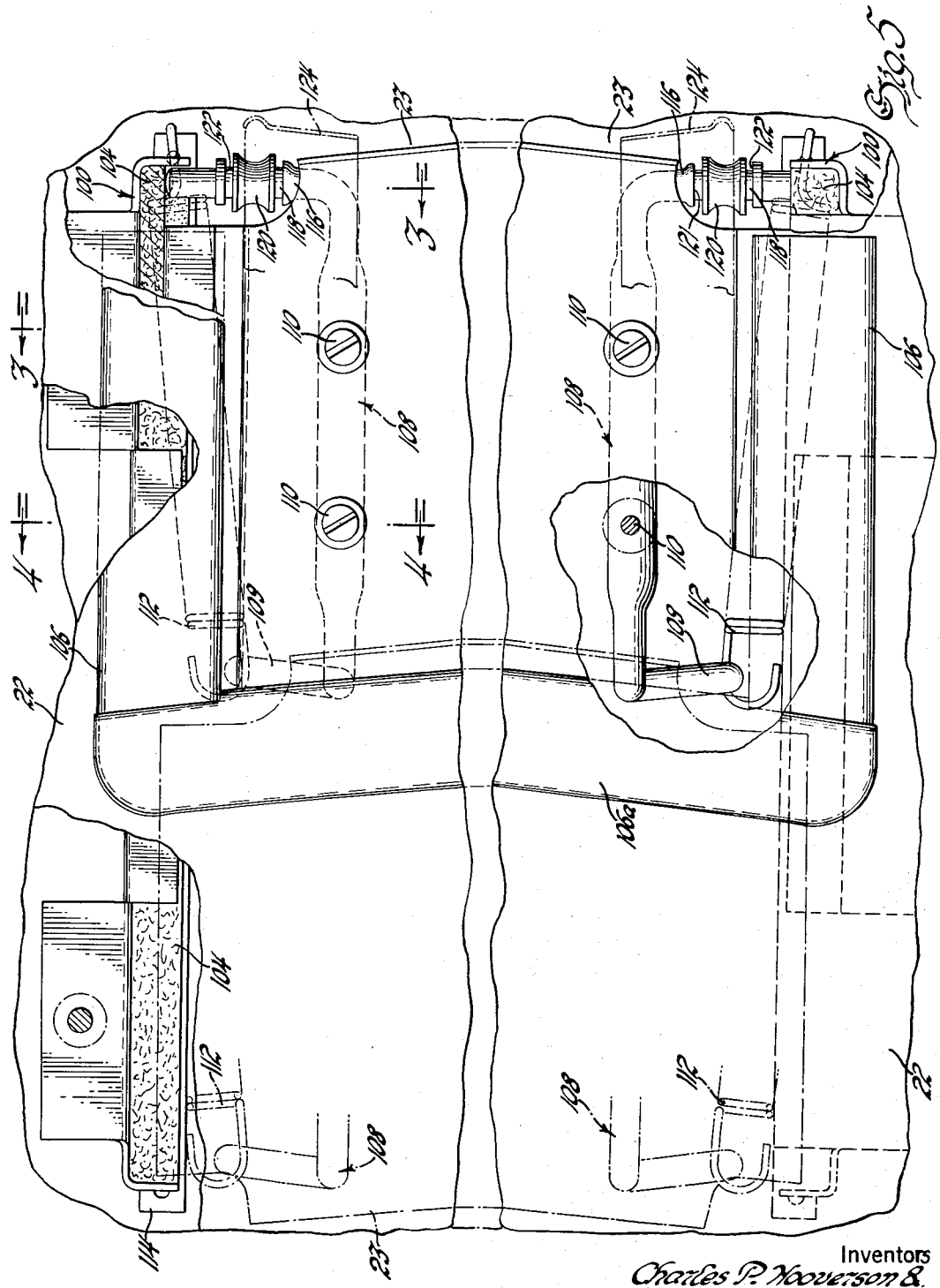

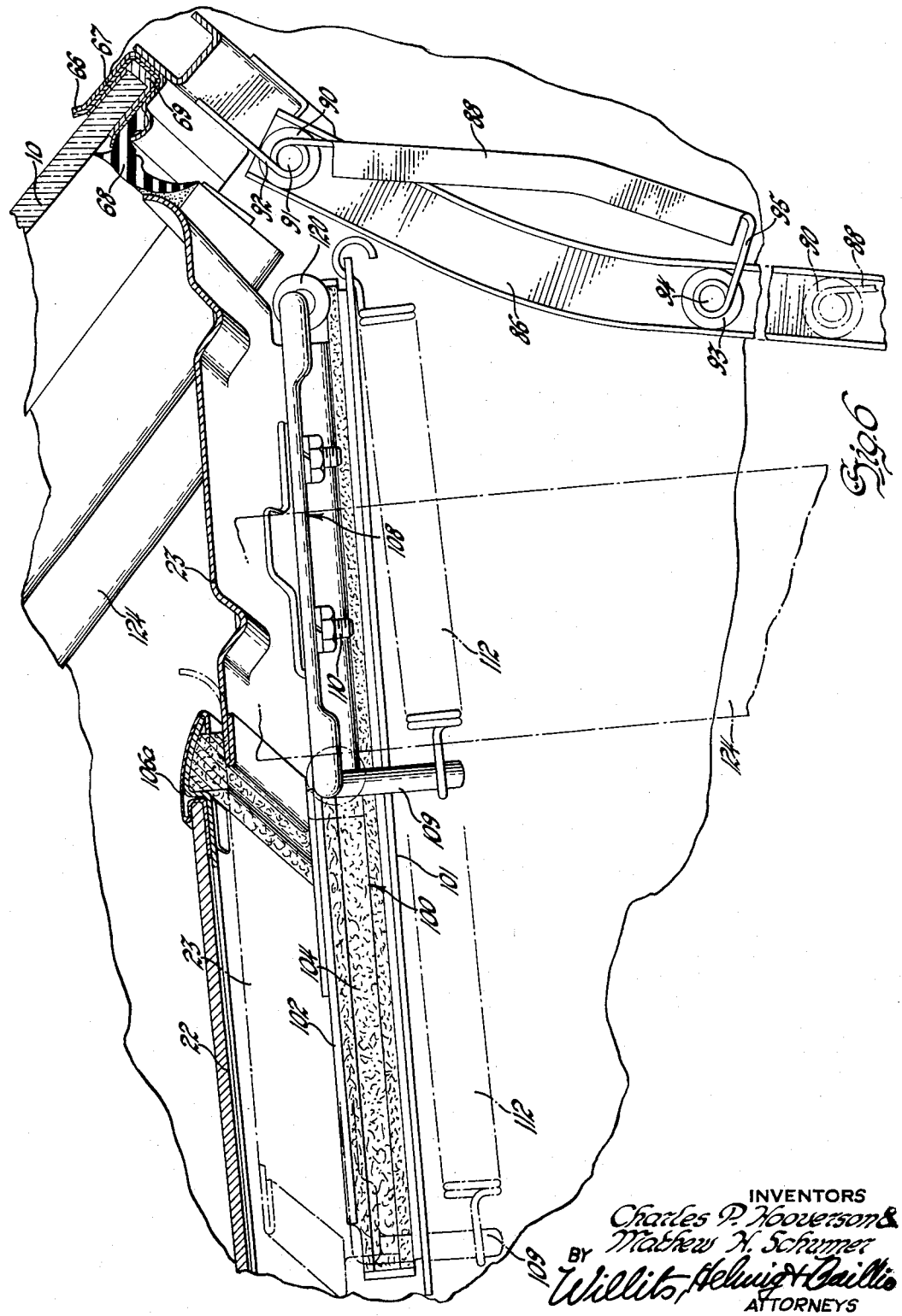

INVENTORS
Charles P. Hooverson &
Mathew N. Schumer
BY Willits, Helwig & Baillio
ATTORNEYS

United States Patent Office 2,747,921
Patented May 29, 1956

2,747,921

RETRACTABLE REAR WINDOW FOR AN AUTOMOBILE

Charles P. Hooverson, Pontiac, and Mathew H. Schumer, Detroit, Mich., assignors to General Motors Corporation, Detroit, Mich., a corporation of Delaware Application December 22, 1952, Serial No. 327,314

16 Claims. (Cl. 296—44)

This invention relates to a retractable window, and more particularly to a retractable rear window for an automobile.

In most hard top automobiles the rear window is fixed in closed position and cannot be opened. The invention disclosed and claimed in the copending application of Alfons A. Limberg and Thomas Roberton, entitled "Retractable Automobile Back Window," filed September 26, 1952, as S. N. 311,712, now Patent No. 2,714,035, provides an improved rear window for an automobile which may be moved between closed position and open or retracted position, and which is operated by power means, as, for example, a fluid actuated piston and cylinder device. When the window is closed it lies in a plane which is oblique to a vertical plane, since the back of modern automobiles slopes forwardly. In order to open the window it must be moved below the package shelf behind the rear seat of the automobile, and during this movement it must move into a different plane, assuming a substantially vertical position.

Since the window is curved longitudinally, and since the lower side of the window may move forwardly when the window is moved to retracted position, it is necessary to provide an opening of substantial width in order to accommodate the window during its generally vertical movement. In the apparatus disclosed in application S. N. 311,712 (now Patent No. 2,714,035) a portion of the package shelf was carried by the movable window, being secured to said window adjacent the lower edge of the window. When the window was moved into retracted position, this portion of the package shelf moved down with the lower edge of the window to provide an opening of substantial width to accommodate the window during its movement.

The present invention provides an improvement over the structure shown in application S. N. 311,712, in that a portion of the package shelf adjacent the window is movable horizontally and means are provided for causing said portion to be cammed forwardly by the window as the window moves into its retracted position. The horizontally movable package shelf portion is spring biased in the direction of the window so that it remains in contact with the window and eliminates the need for a wide opening in the package shelf adjacent the window. When the window is moved back into closed position the package shelf is constantly spring urged into a position closely adjacent the window so that there is never an opening between the window and the package shelf through which small articles might fall.

Other features and advantages of the invention will be apparent from the following description and from the drawings, in which:

Fig. 1 is a vertical section taken longitudinally of the automobile and partially broken away, showing the rear window and package shelf of an automobile, parts being shown in solid lines in one position and in broken lines in another position;

Fig. 2 is a fragmentary transverse vertical section through the automobile taken along the line 2—2 of Fig. 1 and looking forwardly, parts being shown in solid lines in one position and in broken lines in another position;

Fig. 3 is a fragmentary transverse vertical section taken along the line 3—3 of Fig. 5;

Fig. 4 is a fragmentary transverse vertical section taken along the line of 4—4 of Fig. 5;

Fig. 5 is a top plan view showing the improved package shelf, the center portion of the package shelf being broken away and parts being shown in solid lines in one position and in broken lines in another position;

Fig. 6 is an enlarged fragmentary section similar to a portion of Fig. 1, parts being shown in solid lines in one position and in broken lines in another position;

Figure 7:
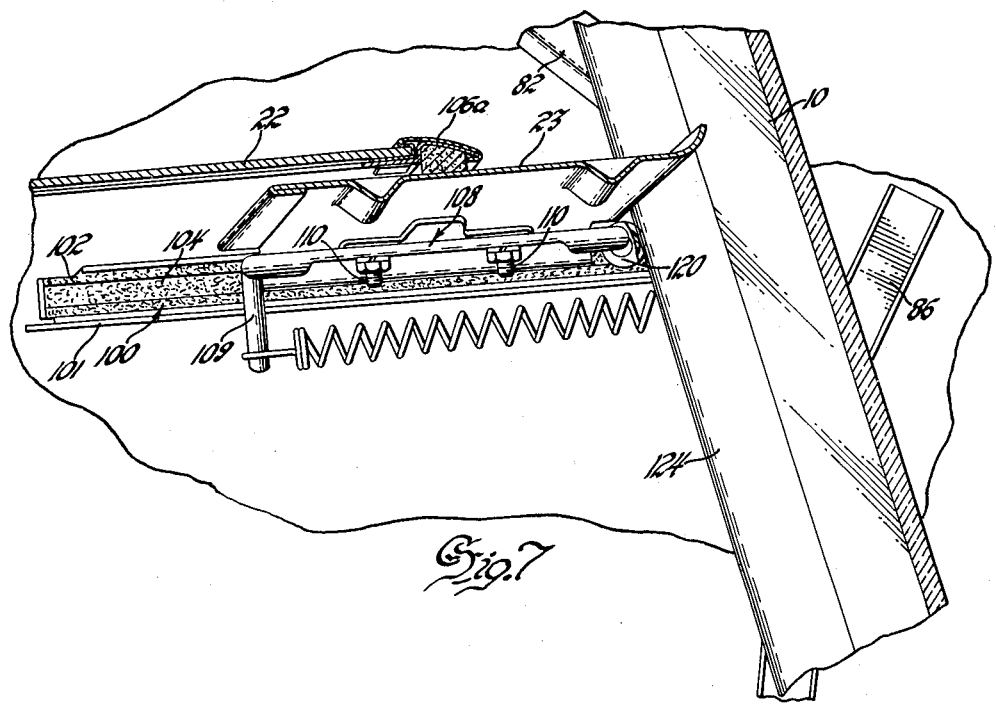
Fig. 7 is a fragmentary vertical section similar to a portion of Fig. 6, but showing the position of the parts when the window is partially retracted.

Referring more particularly to the drawings, 10 is the main glass panel of the rear window of an automobile, the panel 10 being flanked at its opposite sides by subsidiary panels 12 and 14. The panels 10, 12 and 14 are separated by division posts having thereon trim strips 16 and 18. As shown in Figs. 1, 2, 6, 7 and 8, the panel 10 is curved in longitudinal and transverse planes, extending farther rearwardly of the automobile at the center of the automobile than adjacent the sides thereof.

As shown in Fig. 1 in solid lines, the window 10, when closed, extends obliquely over the rear seat back 20 and over a package shelf comprising a stationary portion 22 and a movable closure panel 23 forming an extension of the stationary portion. The construction and operation of the movable panel 23 and its associated apparatus will be described in detail hereinafter. The window is movable from closed position to retracted position where it is housed in a vertical position substantially entirely beneath the level of the package shelf. The operating means for moving the window shown in Fig. 2 comprises a hydraulic device having a piston (not shown) in a cylinder 24 which is pivotally mounted at 26 on a mounting bar 28 depending from a fixed anchor bar 30. The cylinder 24 is connected to a source of fluid by a hose 32, and conventional fluid supply means and valve means (not shown) may be provided for moving the piston in the cylinder. A piston rod 34 projects from the cylinder and is pivotally connected at 36 to an L-shaped arm, designated generally as 37, having a relatively short portion 38 which is pivoted at 40 to the end of the fixed anchor bar 30. A relatively long portion 42 of the arm 37 carries one side of the window panel 10.

At a point 44 intermediate the arm portions 38 and 42 the arm 37 is pivotally connected to another L-shaped arm designated generally as 45 and having a relatively short portion 46 which is pivoted on one end of a bar 48, said bar being pivoted at its other end at 50 on a frame member 52 which supports the fixed anchor bar 30. The L-shaped arm 45 also has a relatively long portion 54 which carries the other side of the window panel 10.

Figure 8:
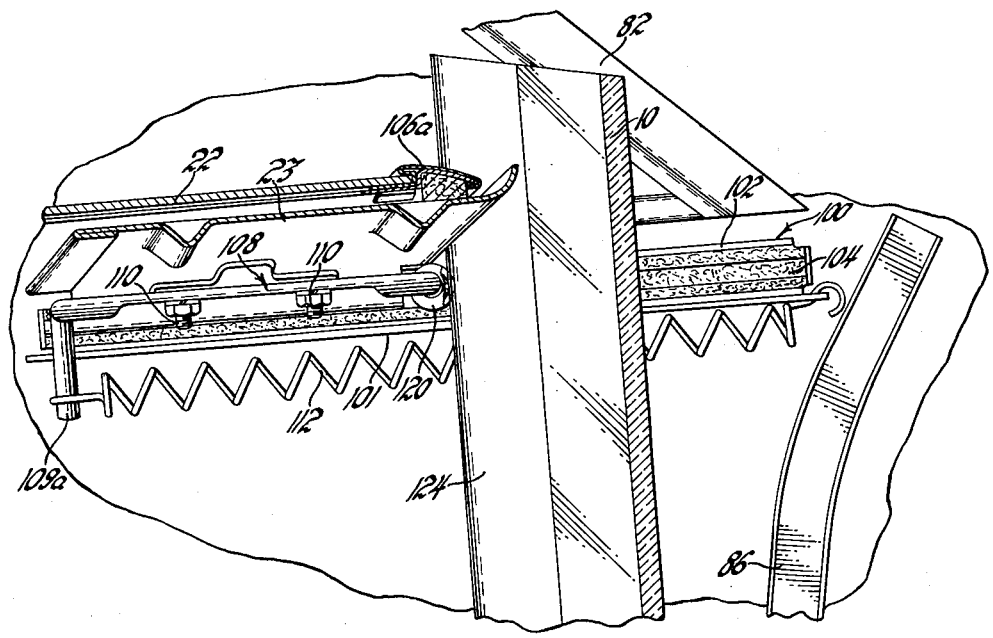
Fig. 8 is a section similar to Fig. 7, but showing the parts when the window is fully retracted.

When fluid supplied through hose 32 drives the piston to the outer end of the cyclinder 24 the arms 37 and 45 are in the position shown in solid lines in Fig. 2, wherein the window panel 10 is held in its closed position. When fluid pressure in the cylinder 24 is released, a spring 56, which is connected between the arm 46 and the bar 28, causes the arms 37 and 45 to swing in a generally vertical plane to the position illustrated in broken lines in Fig. 2, whereby the window panel 10 is moved to its retracted position. It will be noted that the arms 37 and 45 move in a given plane, i. e., a generally vertical plane in the apparatus as illustrated. However, the window panel 10 must move from closed position, where it lies in a plane oblique to the vertical, to a retracted position in a generally vertical plane, as illustrated in Figs. 1, 7, and 8, and during this movement no portion of the panel 10 can pass outside of the peripheral sealing means if a proper seal is to be provided when the window is in its closed position.

Figs. 1 and 6 show the peripheral sealing means for the lower edge of the window panel 10. The lower edge of the panel 10 is carried in a channel member having an outer portion 66 and an inner portion 67, a rubber sealing member 68 being clamped between the channel portions 66 and 67. A gasket 69 is mounted between the edge of the glass 10 and the metal channel. The deck panel 70 of the automobile has mounted thereon a trim strip 71 holding a clamping strip 72, and a rubber seal member 73 is clamped between the edge of the deck panel 70 and the clamping strip 72.

In the means for connecting the movable window panel 10 to the operating arms 37 and 45 similar parts are found at opposite sides of the window panel 10, and in order to simplify the description the parts at only one side of the panel will be described, and similiar parts at the opposite side will be designated by like reference character.

Track members 82 are carried by the respective division post frame members at the side of the panel 10 and extend generally parallel thereto. Rollers 83 (Fig. 2) are carried on posts projecting from the window channel 66 and engage the respective tracks 82 to provide for substantially straight line movement of the upper edge of the window panel 10 as the panel moves from closed to open position.

Guide channels 86 (Figs. 1, 2, 6, 7, and 8) on opposite sides of the panel 10 extend downwardly below the level of the package shelf extension 23. As shown in Fig. 1, these guide channels have a lower straight portion extending generally parallel to the plane in which the arms 37 and 45 move, and an upper curved portion diverging from said plane to provide a curved path of movement for the lower edge of the window panel 10. Brackets 88 are movable along the respective guide channels 86, each bracket mounting a roller 90 adjacent its upper edge. As shown in Figs. 1 and 2, each roller 90 is carried on a shaft 91 which is rotatably journalled in a bore formed by spaced rolled edge portions of a hinge member 92 which is secured to and projects at a right angle from the lower edge of the window panel 10. The upper edge of each bracket 88 is rolled about the shaft 91 between the spaced edge portions of the hinge member 92 to complete the hinge and form a pivotal connection between brackets 88 and the lower edge of the window panel 10. At its lower edge each bracket 88 carries a roller 93, a shaft 94 which mounts this roller being carried on a flange 95 projecting from the lower edge of bracket 88.

During movement of the window from closed position to retracted position the upper roller 90 engages both the straight and curved portions of the track 86, while the lower roller 93 engages only the straight portion of said track and therefore the lower roller moves only in one plane. However, the bracket 88 tilts as it is moved between its lower position and its upper position, as shown clearly in Fig. 1, and therefore the connection between the lower edge of each bracket and the one of the operating arms 37 or 45 to which said bracket is connected must accommodate the tilting. To provide this connection, track members 96 are carried on a connecting bar 97 which extends between the brackets 88. The arms 37 and 45 carry rollers 98 which engage the tracks 96. In order to accommodate the tilting action of the brackets 88, the upper side of each track 96 is shaped so that it provides a pivot for the upper side of the associated roller 98, this construction being best shown in Fig. 1 wherein the upper side of the track 96 is seen to be arcuate and to have a radius generally the same as the radius of the rolling surface of the roller 98.

The lower side of each track 96 is so shaped that it provides a sliding surface for the lower side of the associated roller 98, the lower side of each track 96 being formed on an arc having its radius at the center of the upper side of said track.

Fig. 1 shows how the lower side of the rollers 98 slide along the lower surface of the track to permit tilting of the brackets 88 so that the window panel 10 may move between its closed and retracted positions upon movement of the arms 37 and 45 in a given plane. This construction permits the window to move between its two positions without having any portion of the window panel move outside the window sealing means, and, at the same time, the window panel is wedged into sealing position by the last portion of its movement to closed position.

During operation of the window from closed position to open position it will be seen that a space of substantial width (measured in a direction extending longitudinally of the automobile) is necessary to permit movement of the window because the window lies in an oblique plane when in closed position as shown in Fig. 1 and 6 and does not assume a vertical position until it approaches the end of its downward travel. Obviously, it would not be desirable to leave a wide opening between the end rear of the package shelf and the window when the window is closed, since articles placed on the package shelf could fall through the opening and become lodged behind the back 20 of the rear seat.

In order to provide an opening to accommodate movement of the window from closed to open position without leaving an opening between the window and the package shelf when the window is closed the movable closure panel 23 and its associated apparatus are provided. The closure panel 23 is slidably mounted on fore and aft tracks designated generally as 100, these tracks being supported on the inner edges of the arms of the generally U-shaped stationary portion 22 of the package shelf at each end of the main window panel 10. As shown in Figs. 3, 4, 7, and 8 each track comprises a channel member 101 which is bolted to a frame member 22a supporting the stationary portion 22 of the package shelf. The track itself comprises a channel member 102 which carries an elongated strip of felt or the like, 104, which is U-shaped in transverse section and which receives a flange 106 (Fig. 4) which projects outwardly at each side of the movable closure panel portion 23 of the package shelf. The stationary portion 22a of the package shelf is provided with a trim strip 106 which overlies the track 100 and hides the track from view, the trim strip having a portion 106a extending transversely of the automobile body above the rear edge of the panel 23 when the window 10 is in closed position as shown best in Figs. 5, 6, 7 and 8.

Adjacent each side of the movable closure panel 23 a rod designated generally as 108 is mounted, bolts 110 securing each rod 108 to the underside of the panel 23. At its forward end each rod has a bent portion 109 provided with an aperture 109a (Figs. 3 and 4) for the reception of one end of a coil spring 112, the other end of the spring being secured to a stationary support.

Referring particularly to Figs. 3 and 5, the rear end of each rod 108 has a portion 116 which is bent at a right angle and which has its end received in the groove between the arms of the U-shaped felt member 104 to provide additional supporting means for the movable panel 23 in the track 100. Intermediate the ends of the bent portion 116 a hub portion 118 is provided for mounting a roller 120, shoulders 121 and 122 serving to limit axial movement of the roller 120. Each roller 120 is adapted to engage a cam track 124 carried at each end of the window panel 10, these cam tracks preferably being chrome plated to provide a neat appearance.

The operation of the movable closure panel 23 may best be seen from Figs. 6, 7, and 8. When the window 10 is in closed position the movable panel 23 is in its most rearward position, being held in this position by the springs 112 at each side of the panel. With the panel in this position the rear edge of the panel lies closely adjacent the sealing strip 68 at the bottom edge of the window 10, so that there is no noticeable space between the panel 23 and the lower edge of the window 10, and the entire surface of package shelf portions 22 and 23 can be used in the normal manner. The rear edge of the panel 23 is curved on an arc complementary to the curvature of the lower edge of the window panel 10.

When the window 10 is moved from its closed position as shown in Fig. 6 to an open or retracted position the lower edge of the window moves forwardly along the curved track 86 as shown in Figs. 1 and 6, and the roller 120 at each side of the movable closure panel 23 rides on the cam track members 124 at each side of the window so that the closure panel 23 is cammed forwardly upon movement of the window. In Fig. 7 the window has started its movement towards retracted position and the movable panel 23 has been cammed against the force of tension spring 112 to a position intermediate its limits of movement. In Fig. 8, the window is substantially fully open and lies in a substantially vertical plane, and the movable panel 23 has been cammed farther forwardly almost to its limit of movement. When the window 10 is moved upwardly from the position of Fig. 8 to closed position the tension springs 112, which bias the closure panel 23 toward the window 10, cause movement of said panel back to the position shown in solid lines in Fig. 6.

While we have shown and described one embodiment of our invention, it is capable of many modifications. Changes, therefore, in the construction and arrangement may be made without departing from the spirit and scope of the invention as set forth in the appended claims.

We claim:

1. Apparatus of the character described, including: a window; means for moving said window between two terminal positions in different planes; a closure panel in the path of movement of the window comprising a shelf located adjacent one edge of the window when the window is in one terminal position; means adjacent said window for mounting said panel for lateral bodily movement relative to said window; and operating means on said panel engaging said window, movement of said window in one direction causing lateral bodily movement of said closure panel in another direction.

2. Apparatus of the character described, including: a vehicle window having a camming surface; means for moving said window between two terminal positions; a closure panel in the path of movement of the window comprising a shelf located adjacent one edge of the window when the window is in one terminal position; means adjacent said window for mounting said panel for lateral bodily movement relative to said window in directions angular to the plane of said window; and operating means on said panel engaging the camming surface of said window, movement of said window causing lateral bodily movement of said closure panel in a direction angular to the direction of window movement.

3. Apparatus of the character described, including: a window having a camming surface; means for moving said window between two terminal positions; a slidably movable closure panel in the path of movement of the window comprising a shelf located adjacent one edge of the window when the window is in one terminal position; means adjacent said window for mounting said panel for slidable movement relative to said window in directions angular to the plane of said window; and operating means on said panel engaging the camming surface of said window, movement of said window causing sliding movement of said closure panel in a direction angular to the direction of window movement.

4. Apparatus of the character described, including: a vehicle window having a camming surface; means for moving said window between open and closed terminal positions in different planes; a slidably movable closure panel in the path of movement of the window, said panel comprising a shelf located adjacent the lower edge of the window when the window is in closed position; means adjacent said window for mounting said panel for slidable movement relative to said window in directions angular to the plane of said window; operating means on said panel engaging the camming surface of said window, movement of said window causing sliding movement of said closure panel in a direction angular to the direction of window movement; and yieldable means biasing said panel in the direction of said window to maintain the operating means on the panel in engagement with said camming surface.

5. Apparatus of the character described, including: a vehicle window having a camming surface; means for moving said window in a generally vertical direction between two terminal positions; a slidably movable closure panel forming a shelf adjacent said window; means adjacent said window for mounting said panel for slidable movement in a generally horizontal direction toward and away from said window; and cam means on said window and panel for sliding said panel in a horizontal direction upon movement of said window in a generally vertical direction.

6. In a vehicle, apparatus of the character described, including: a vertically movable window; a horizontally bodily movable closure panel forming a shelf adjacent said window; and cam means having portions on said window and portions on said panel for moving said panel bodily in a horizontal direction upon movement of said window in a vertical direction.

7. In a vehicle, apparatus of the character described, including: a window movable vertically between closed and open positions; a horizontally bodily movable closure panel forming a shelf adjacent said window; spring means biasing said panel into engagement with said window; and cam means for moving said panel horizontally in a rectilinear path upon movement of said window from closed to open position.

8. In a vehicle, apparatus of the character described, including: a window movable in a generally vertical direction between a closed position in a plane which is oblique to the vertical and an open position in a generally vertical plane; a horizontal closure panel forming a shelf adjacent the lower edge of said window when in closed position; means for mounting said closure panel for rectilinear bodily movement in a horizontal plane toward and away from said window; and cam means having portions on said window and portions on said panel for moving said panel horizontally upon movement of said window from closed to open position.

9. In a vehicle, apparatus of the character described, including: a window movable in a generally vertical direction between a closed position in a plane which is oblique to the vertical and an open position in a generally vertical plane; a horizontal closure panel forming a shelf adjacent the lower edge of said window when in closed position; means for mounting said closure panel for bodily movement in a horizontal plane toward and away from said window; spring means biasing said panel into engagement with said window; and cam means having portions on said window and portions on said panel for moving said panel horizontally upon movement of said window from closed to open position.

10. Apparatus of the character claimed in claim 9, wherein said window is curved in a direction extending longitudinally of said panel, and wherein the edge of said panel adjacent the window is curved along an arc complementary to the curve of said window.

11. In a vehicle, apparatus of the character described, including: a window movable in a generally vertical direction between a closed position in a plane which is oblique to the vertical and an open position in a generally vertical plane; a horizontal closure panel forming a shelf adjacent the lower edge of said window when in closed position; track means for mounting said closure panel for sliding movement in a horizontal plane toward and away from said window; a cam track on said window; and a cam follower on said closure panel for moving said panel horizontally upon movement of said window from closed to open position.

12. In an automobile, apparatus of the character described, including: a window movable in a generally vertical direction between a closed position in a plane which is oblique to the vertical and an open position in a generally vertical plane; a horizontal closure panel forming a shelf adjacent the lower edge of said window when in closed position, said window being curved in a direction extending longitudinally of said panel, and the edge of said panel adjacent the window being curved along an arc complementary to the curve of said window; track means for mounting said closure panel for sliding movement in a horizontal plane toward and away from said window; spring means biasing said panel toward said window; a cam track on said window; and a cam follower on said closure panel for moving said panel horizontally upon movement of said window from closed to open position.

13. Apparatus of the character described, including: an automobile body having a horizontal package shelf; a window movable between closed position in an oblique plane above said shelf and open position in a vertical plane below said shelf; operating means for moving the window between said two positions; a horizontal closure panel adjacent said window and forming an extension of said package shelf; track means for mounting said closure panel for sliding movement in a horizontal plane toward and away from said window; a cam track on said window; and a cam follower on said closure panel for moving said panel horizontally upon movement of said window from closed to open position.

14. Apparatus of the character described, including: an automobile body having a horizontal package shelf; a window movable between closed position in an oblique plane above said shelf and open position in a vertical plane below said shelf; operating means for moving the window between said two positions; first guide means extending above said shelf in a direction generally parallel to said oblique plane and providing a path of movement for the upper end of said window; means connecting said end of the window to said guide means; second guide means extending below said shelf in a direction generally parallel to said vertical plane and providing a path of movement for the lower end of said panel; means interconnecting said lower end of the window and said operating means; a horizontal closure panel adjacent said window and forming an extension of said package shelf; track means for mounting said closure panel for sliding movement in a horizontal plane toward and away from said window; a cam track on said window; and a cam follower on said closure panel for moving said panel horizontally upon movement of said window from closed to open position.

15. Apparatus of the character claimed in claim 14, wherein said window is curved in a direction extending longitudinally of said panel, and wherein the edge of said panel adjacent the window is curved along an arc complementary to the curve of said window.

16. In an automobile, a movable back window; a package shelf adjacent said window, said shelf having a movable portion in the path of movement of said window; means for moving said window in a generally vertical direction between closed and open positions; and means on the window for moving the slidable portion of said package shelf in a generally horizontal direction as a function of movement of the window.

References Cited in the file of this patent

UNITED STATES PATENTS

| | | |
|---|---|---|
| 1,393,192 | Baker | Oct. 11, 1921 |
| 1,448,981 | Summerscales | Mar. 20, 1923 |
| 1,907,799 | Hardtke | May 9, 1933 |
| 1,935,468 | Dittus | Nov. 14, 1933 |
| 2,185,581 | Bessonneau | Jan. 2, 1940 |
| 2,206,334 | Rosner | July 2, 1940 |
| 2,371,183 | Parsons | Mar. 13, 1945 |
| 2,599,277 | Orr | June 3, 1952 |

FOREIGN PATENTS

| | | |
|---|---|---|
| 575,257 | France | Apr. 18, 1924 |
| 464,270 | Great Britain | Apr. 14, 1937 |
| 142,648 | Australia | Feb. 24, 1949 |